United States Patent [19]

Fox et al.

[11] Patent Number: 5,521,813
[45] Date of Patent: May 28, 1996

[54] SYSTEM AND METHOD FOR THE ADVANCED PREDICTION OF WEATHER IMPACT ON MANAGERIAL PLANNING APPLICATIONS

[75] Inventors: Frederic D. Fox, Philadelphia; Richard J. Fox, Narberth; Michael A. Rhoads, Mt. Penn; Douglas R. Pearson, Wyomissing Hills, all of Pa.; William R. Young, Palm Desert, Calif.

[73] Assignee: Strategic Weather Services, Newark, Del.

[21] Appl. No.: 2,847

[22] Filed: Jan. 15, 1993

[51] Int. Cl.$^6$ .................................................. G06F 17/60
[52] U.S. Cl. ...................... 364/401; 395/923; 395/925
[58] Field of Search ................................... 364/420, 400, 364/401, 402, 403

[56] References Cited

U.S. PATENT DOCUMENTS

| | | | |
|---|---|---|---|
| 4,015,366 | 4/1977 | Hall, III | 47/1 |
| 4,218,755 | 8/1980 | Root | 364/900 |
| 4,766,539 | 8/1988 | Fox | 364/401 |
| 5,063,506 | 11/1991 | Brockwell et al. | 364/402 |
| 5,128,861 | 7/1992 | Kagami et al. | 364/403 |
| 5,140,523 | 8/1992 | Frankel et al. | 364/420 |
| 5,168,445 | 12/1992 | Kawashima et al. | 364/403 |
| 5,189,606 | 2/1993 | Burns et al. | 364/401 |
| 5,237,496 | 8/1993 | Kagami et al. | 364/401 |
| 5,253,165 | 10/1993 | Leiseca et al. | 364/407 |

FOREIGN PATENT DOCUMENTS

| 4135271 | 5/1992 | Japan | 364/401 |
|---|---|---|---|

OTHER PUBLICATIONS

"Down to Earth Sales Analysis 3.1", Business Software Database™, Aug. 18, 1993, available in DIALOG, File No. 256.

"IMREX Demand Forecasting System", Business Software Database™, Aug. 18, 1993, available in DIALOG, File No. 256.

"Demand Modeling & Forecasting System", Business Software Database™, Aug. 18, 1993, available in DIALOG, File No. 256.

Brennan, "Portfolio Managers Weather Global Risk Management Challenge", Wall Street Computer Review 7(1):20 (1989).

Best et al., "Air Weather Service Model Output Statistics Systems", USAF Air Weather Serive, NTIS, AD–A139129 (1983).

Cave, "Weather Service Is a Boon To System Dispatchers", Transmission & Distribution 43(8):165–169 (1991).

Hurrell, "The Weather Business", Intercity, pp. 29–32, Feb. (1991).

The Met Office, "The Weather Initiative", Berkshire England.

Primary Examiner—Gail O. Hayes
Assistant Examiner—Hayward A. Verdun
Attorney, Agent, or Firm—Sterne, Kessler, Goldstein & Fox

[57] ABSTRACT

A computer-based system and method which incorporates long-range weather forecasts in a predictive model which quantifies historical weather impact relationships between datasets, and uses the long-range weather forecasts to predict future weather impact on managerial plans. The predictive model can use multiple regression or a neural network. In a retail application, the computer-based system and method has a weather impact predictive model based on correlations of historical weather and point-of-sale store transactions data. The weather impact model is coupled with long-range weather forecasts to adjust managerial plans for buying, distribution, financial budgeting, promotional and advertising applications. A graphical user interface provides easy assimilation of analysis for specific managerial planning applications.

24 Claims, 15 Drawing Sheets

SYSTEM AND METHOD FOR THE ADVANCED PREDICTION OF WEATHER IMPACT ON MANAGERIAL PLANNING APPLICATIONS

BACKGROUND OF THE INVENTION

1. Field of the Invention

The present invention relates generally to predicting consumer demand patterns in the retail industry, and, more particularly, to the long-range prediction of weather impact on the retail industry.

2. Related Art

I. The Evolution of Retail Industry Problems

The retail industry has experienced a rapid expansion of consumer demand in the last two decades. This increase in demand has enabled a large number of retailers to grow at the local, regional, and national levels. To meet this growth in consumer demand, most larger national retailers implemented a strategy of store expansion, i.e., increasing the square footage of retail space dedicated to selling products. This strategy, which was particularly common in the early to mid-1980's, resulted in huge increases in the number of stores under operation by a majority of major retailers. Though the increase in square footage enabled the retailers to meet consumer demand, it became difficult to manage the large number of decentralized stores.

These problems were further complicated in the late 1980's and early 1990's. Competition among retailers increased during this period due to recession, personal debt, and maturation of consumer demand. This forced retailers to change their approach from a growth strategy, which solely relied on store expansion, to a productivity-based strategy to maximize return from existing square footage. Essentially, the productivity-based strategy requires the maximum amount of product to be moved through a store at a minimum markdown. Implementation of this strategy resulted in planning and coordination problems to achieve the desired productivity at all levels, national, regional, and local.

The problems resulting from these two strategies are best described with reference to the five functions of the retail industry which are critical to the success of every retailer: buying, distributing, promotion, advertising and financial budgeting. These five functions are of paramount importance to large retailers due to the magnitude of items and locations required to sell directly to consumers.

These five functions are as follows. Buying is the procurement of a product based on an anticipated volume of consumer demand for that product. Distribution is the allocation of the product to the correct locations at the correct times to meet this anticipated consumer demand. Promotion is the offering of an inducement, such as a markdown, to prompt customers to visit a store and purchase specific products. Advertising is the act of selecting and utilizing media to implement promotions, as well as create and foster a desired consumer image for products and the company. Financial budgeting is the act of projecting and authorizing funds expenditures for all aspects of retailer operations to control and maximize financial performance.

Retailers have always been faced with the problem of coordinating the buying, distribution, promotion, advertising and budgeting activities with constantly changing consumer demand behavior. The magnitude of this problem increased dramatically with the rapid growth of multi-store retailers through additional square footage and the subsequent need to increase the productivity of each of these stores. Productivity-based growth strategies created a coordination requirement for accurate buying, distribution, promotion, advertising and budgeting at regional (merchandising region comprised of several states), MSA (metropolitan statistical area) and local (store location) levels. However, all of these functions historically have been controlled in a centralized fashion by managers based at headquarters.

II. Use of MIS Systems For Retail Sales Forecasting

The preferred approach to achieving this centralized control over a decentralized problem has been the development of computer based MIS (management information system). In the retail industry, the primary function of an MIS is the electronic collection, storage, retrieval, and analysis of data. By definition, retailers sell product to the consumer for profit. Naturally, any type of transaction in support of consumer sales activities is collected and flows through the MIS. Note that the term "transaction" is used broadly to represent any type of recordable event taking place in support of consumer sales (i.e., inventory transfer from distribution center to store, promotion data, store traffic, etc), not merely the time, amount and merchandise of a specific sale.

Retailers were initially forced to use mainframe-based MIS systems to store and manipulate data, simply due to the requisite storage and speed of processing provided by mainframe computers. Since understanding of local, MSA and region level dynamics is a requisite for increased retailing productivity, retailers would essentially feed POS (point-of-sale) transactions data at the store level into massive mainframe databases for subsequent analysis to identify basic trends. However, the use of mainframes typically requires the expense of a large MIS department to process data and analysis requests, as well as the delay from the time of request to the actual execution. This structure prevented the MIS systems from becoming cost effective for use by executives in making daily decisions, who are typically not computer specialists and thus had to refer data requests to MIS specialists.

In response to the need for rapid executive interface to data for managerial plan preparation, a large industry developed in Executive Information Systems (EIS) that interfaces into the MIS mainframe or mid-range database but typically operates on personal computer workstation platforms. An EIS system is a computer-based means by which information and analysis can be accessed, created, packaged and/or delivered for use on demand by users who are non-technical in background. An EIS system performs specific managerial applications without extensive interaction with the user, which reduces or eliminates the need for computer software training and documentation.

Technical improvements in speed and storage capability of PCs have allowed this trend to take place, while most firms still maintain a mainframe or minicomputer architecture for basic POS data storage and processing. The planning applications have first been implemented at the national and/or regional levels for buying, distributing, advertising, promotional and financial budgeting, although the basic POS store transactions data flows from each store location. The basic underlying approach of current MIS planning solutions to provide centralized control is to retrieve and store POS (store level) data, aggregate it into historical databases, and manipulate the data into useful productivity-based Executive Information Systems (EIS) yielding basic time-series trends in demand at regional or national levels.

Referring now to FIG. 1, a block diagram of a typical MIS system architecture is illustrated. MIS architecture 102 is designed to capture transactions data, and electronically flow this data throughout the organization for managerial planning and control purposes.

At the point of sale (POS) 104 electronic scanners 108, registers 110, and other electronic scanning and data gathering devices record transactions. Store transactions data 116 is electronically transferred to the headquarters typically by modem or broadcasting means. In a typical retail application, there are multiple point of sale locations. In FIG. 1, point of sale 106 has scanners 112, registers 110, and other electronic scanning and data gathering devices to record transactions in a similar manner to point of sale 104. Point of sale 106 electronically transmits store transaction data 118 to the data storage and retrieval facility 120. The headquarters data storage and retrieval facility 120 receives the data using computer hardware 122 and software 124, which is subsequently used for managerial planning purposes.

For analytical purposes the data is retrieved from data storage and retrieval facility 120 into a data analyzer 126 for use in the preparation of the managerial plan. Retrieval of the data into the data analyzer 126 can be manually generated as indicated by line 134 through a custom request to MIS department personnel or, in the preferred mode, electronically generated as indicated by line 132 into a workstation 128 for immediate viewing and use in the preparation of the managerial plan 130.

Current planning applications software has substantially improved the control of large multi-store retailers over the critical aspects of the retail business (buying, distribution, advertising, promotion, financial budgeting). For example, drawing on the historical sales trend experience of specific merchandise categories at the POS, and factoring in economic and consumer research and forecasting, retailers are more adept at developing national unit sales forecasts for buying and regional allocation for distribution. If they have overstocked at any particular store, product is moved through the store using markdown and other promotional techniques. If retailers understock at a store, buffer inventories and creative supplier relationships such as just-in-time quickly move to replenish. On a national level, these systems have brought major improvements in efficiency and profitability.

Ultimately, however, the goal of most leading multi-store retailers is to enable the MIS applications to perform the analysis at the MSA and/or store level where the true power of the MIS application resides in giving competitive advantage. However, presently, the retail industry has only developed its use of the MIS systems to the point of planning on a regional basis with anywhere from 5–20 merchandise regions. The present management structures and culture are gradually adjusting from the national to the more specific regionality in their decision-making process. This slow transition in the use of data inhibits the transition from national-to-regional-to-MSA-to-local analysis.

III. Weather Forecasting

Most retailers acknowledge weather as a critical variable to sales demand but have had little interest in, or means to address, weather impact from a planning perspective. Relative to weather issues specifically, MIS planning applications systems (both custom and packaged) have virtually ignored this planning variable, at least until very recently. This is partially due to the majority of national retailers only having a fully integrated POS MIS system operational for 3 to 5 years. This is also due to the slow transition in the use of data from the national level data to the MSA and store level.

A. The Nature of Weather Anomalies

Weather anomalies are more of a regional and local phenomenon rather than a national phenomenon. This is not to say that major anomalies cannot sweep an entire country or continent, creating abnormally hot or cold seasons, but they are less frequent than regional or local aberrations. Major precipitation and temperature anomalies occur continually on daily, weekly and monthly intervals in specific regions, MSAs or locations throughout the United States.

Another key point to consider about weather is that actual daily, weekly and monthly occurrences fluctuate greatly around the long term "normal" or "average" (in meteorology, normal is typically defined as a 30 year) trend line. In other words, past historical averages are a very poor predictor of future weather on a given day, week or month. Implicitly, weather effects are already embedded in an MIS POS database, so the retailer is consciously or unconsciously using some type of historical weather average as a factor in any planning approach that uses a trendline forecasts based on historical POS data for a given location and time period.

B. Weather Relative to National Planning Applications

At a national level, weather is only one of several important variables driving consumer demand for a retailer's products. Several obvious and usually more important factors are, for example, price, competition, quality, gross national product (GNP) trends, advertising exposure, and structure of the retailer's operations (number of stores, square footage, locations, etc). Relative to the national and regional implementation of planning, the impact of these other variables dominates trendline projections.

As described above, POS databases track sales trends of specific categories at specific locations which are then aggregated and manipulated into regional and national executive information reports. Since local and MSA weather anomalies can average out when aggregated to the national levels, the impact of weather has not received much scrutiny relative to national planning and forecasting. Weather occasionally creates dramatic increases or decreases in product demand on a national level but this is more of an exception as opposed to the rule. (In product manufacturing, this is not the case; weather often creates dramatic gains and losses for highly weather impacted manufacturers, such as air conditioners.)

IV. Weather Relative to Regional and Local Planning Applications

The impact of weather on a regional, MSA and local level is direct and dramatic. At a store level, weather is often the key driver of sales of specific product categories, and also influences store traffic which impacts sales of all goods. Weather directly influences timing and intensity of markdowns, and can create stockout situations which replenishment cycles can not address due to the inherent time lag of many replenishment approaches.

The combination of lost sales due to stockouts and markdowns required to move slow inventory, are enormous hidden costs, both in terms of lost income and opportunity costs. Aggregate these costs on a national level, and weather is one of the last major areas of retailing where costs can be carved out (eliminate overstocks) and stores can improve productivity (less markdown = more margin with same square footage).

Industry market research indicates that on average, many mass retailers operate with only a 50–60% fill rate, meaning approximately 50% of the time a customer in a store cannot find the desired product in stock. A one percent improvement in this fill rate can provide large improvement to the operating profits of a national retailer.

In short, weather can create windows of opportunity or potential pitfalls that are completely independent events relative to economics, consumer income, and competitive issues (price, quality). The cash and opportunity costs in the aggregate are enormous. Presently, the centralization of decision making has generally masked the importance of weather as a critical variable to retailing performance, as sharp local sales fluctuations due to weather tend to average out when aggregated into national numbers.

V. Conventional Solutions

Though the majority of retailers acknowledge the effects of weather, many do not consider weather as a problem per se, because they view it as a completely unpredictable part of the external environment, something that "everyone in the business lives with."

However, the underlying problem is in essence one of prediction of the future; developing a predictive model. Everyone in retail must forecast (informally or formally) how much inventory to buy and distribute based on expected demand and appropriate inventory buffers. Since weather is a critical driver of consumer demand for seasonal items, weather is part of this broader predictive modelling process that all retailers go through. Hence many conventional solutions exist to the overall predictive modelling process, none of which adequately addresses weather impact.

One conventional solution is not to consider the impact of weather. In such instances, the retailer will maintain high inventory levels and rapidly replenish the inventory as it is sold. This approach creates high working capital to support such a large inventory.

Another conventional solution is for the retailer to use past weather patterns to anticipate future consumer demands. This qualitative insight by decisionmakers has been proven to be inaccurate, subjective, and lacks regionalization. In addition, this method is not evaluating weather in a predictive sense.

Another conventional solution is the use of macroeconomic models. These methods typically lack regional specificity, only use historical weather data (typically long term "normals") which is a poor predictor, and typically do not tie into predictive models utilizing POS store transactions data 116, 118 (see FIG. 1). Since these models are not intended for regional and local applications, they are generally regarded as having poor accuracy on these levels. In addition, this approach does not have the one week forecast specificity required for retail planning, the typical retail planning increment of time.

Another conventional approach is the utilization of broad climatology forecasts. Manufacturers and retailers have been known to rely on broad projections developed by the National Weather Bureau (the governmental entity in the U.S.A.) and other private forecasting firms. These projections are generally acknowledged as being vague, broad projections, usually several sentences or paragraphs long, and of questionable accuracy. They completely lack the requisite regional or local specificity as well as the one week time increment, usually issued on a 30, 60 or 90 day basis. Also, these projections are not quantitative and therefore cannot easily integrate with an MIS-based planning system.

Another conventional approach is to address seasonality in databases. Many retailers graph basic seasonality curves based on POS data, calculating an average rate of sales and a seasonality value for any given week. This approach does not address weather specifically, but it does directly address seasonality at a national, regional, and local (store) level by calculating deseasonalized demand indexes (average rate of sales) and seasonality indices. While this approach has the requisite geographic specificity, it still has the same problem of relying on a historical average weather to determine the future weather impact. Regional, MSA and local weather fluctuates greatly around any type of historical "normal," rendering such projections invalid. One popular mainframe applications package which uses this approach is INFOREM, manufactured by International Business Machines, Poughkeepsie, N.Y., U.S.A.

Another conventional approach is to utilize short (1–3 day) forecasts from the National Weather Bureau or private forecasting service to qualitatively or quantitatively adjust decisions. These services typically issue weather reports for a nominal fee to commerce and industry. These reports are fairly accurate 1–3 days in advance for specific regions and MSAs. The accuracy drops off very quickly, and beyond 5–7 days, the regional specificity also broadens dramatically. The National Weather Bureau also issues very broad 30, 60 and 90 projections of limited commercial value. Forecasting which are limited to 1–3 days in the future do not serve the planning applications which require weeks, months or a even year of leadtime.

Another conventional solution is the use of multiple regression correlation. The technique of applying the least squares multiple regression algorithm to weather and sales datasets is approximately 30 years old. Some conventional approaches which use a form of this technique simply measure the weather impact from a market research perspective, and do not couple the correlation with forecasts for a predictive planning purpose. Use of this technique and others have been used in the utilities industry for 10–20 years to weather normalize results in a regulated public utility environment (weather accounts for 95%+ of variability in energy demand for regulated applications). Any consumption projections based on forecasts only look at 1–3 days in advance.

In the United Kingdom (UK), The Weather Initiative Ltd. (TWI), a division of the MET Office (England's equivalent of the United States National Weather Bureau) provides a correlation service coupled with short term (1–3 day) forecasting to adjust short term sales forecasts. TWI asserts that it has incorporated this concept into a software package for the MURCO Inc. stocking/distribution MIS system which is sold in the UK by Thorn/EMI Inc.

In summary, the above conventional solutions to weather planning problems in retail all suffer from one or several deficiencies which severely limit their commercial value, by not providing: (1) regional and/or local specificity in measuring past weather impact and projecting future weather impact, (2) the one week time increment of planning and forecasting required in the retail industry, (3) ample forecast leadtime, (anywhere from 1 week to 15 months), required by such planning applications as buying, advertising, promotion, distribution, and financial budgeting, (4) the quantification of weather impact required for precise planning applications such as unit buying and unit distribution and financial budget forecasting, (5) accuracy beyond a 3 day leadtime, (6) a predictive weather impact model, which links quantitative weather impact measurement through historical correlation, with quantitative, weekly forecasts, (7) an entirely electronic, computerized, EIS implementation for ease of data retrieval/analysis with specific functions that solve specific managerial planning applications 206–214 (EIS embodiment is a requirement for retail industry planners due to the lack of meteorological familiarity and the huge data manipulations) and (8) a graphical user interface represents the predictive model in graphs, formats, and charts immediately useful to the specific managerial applications of buying 206, advertising 210, distributing 208, promoting 212, and financial budgeting 214. By way of example, the graphical user interface provides a powerful screen which tells the user exactly when, where, and what to advertise versus a less useful numerical index.

What is needed is a Long-range Weather Executive Information System(LEWIS), containing a weather predictive model which provides specificity for both the location (MSA or store level) and time increment (one week). The forecast must be available early enough(1 week to 15 months in advance) to provide the necessary lead time for retail planners to respond to the data, and must be accurate. The LEWIS must interface to the present MIS system, and represent the analysis quickly and in a form which is tailored to the specific planning applications of the retail manager.

SUMMARY OF THE INVENTION

The present invention is a computer-based EIS incorporating long-range weather forecasts prepared utilizing a modelling technology. The weather forecasts are incorporated into a predictive model which quantifies historical weather impact relationships between datasets, and uses the long-range weather forecasts to predict future weather impact on managerial plans. The invention provides future predictions of weather impact from 3 days to 15 months in advance with a high degree of accuracy (typically around 70%).

The present invention can utilize various correlation techniques in its weather impact predictive model, both multiple regression and neural network based. The invention correlates weekly weather variables with a weekly POS store transaction variables dataset for specific locations, thus quantifying the weather impact model in terms of unit or dollar sales volume change, or any other commercially useful benchmark.

For buying, distribution and financial budgeting applications, the weather impact model is used in conjunction with 1) weekly weather forecasts (up to 15 months in the future), and 2) a managerial plan forecast for a specific time, product and location. The resulting output represents a weather-adjusted forecast for buying, distribution, or financial budgeting, and is manipulated by a graphic user interface (GUI) into useful charts, graphics and reports for rapid assimilation by the user.

For advertising and promotional applications, the weather impact model is used in conjunction with store transaction data and forecasted weather data. The output identifies how products are favorably or unfavorably impacted by weather at any given location (that is, cold impact versus hot), the degree of the impact, and most importantly, the most favorable timing for advertising and promotional campaigns to take advantage of weather impact.

The GUI provides a host of executive reports, charts, and graphs that are tailored for specific managerial applications to aid in rapid assimilation and incorporation of the analysis in planning process.

In summary, the invention is an EIS, which has: (1) a weather impact predictive model based on correlations of historical weather data and POS store transactions data, (2) inputs from a predictive model into (3) a forecasting processor for all applications, and (4) a GUI designed to provide rapid assimilation of analysis for specific managerial planning applications.

BRIEF DESCRIPTION OF THE DRAWINGS

This invention will be better understood if reference is made to the accompanying drawings in which.

DETAILED DESCRIPTION OF THE PREFERRED EMBODIMENTS

1. General Overview

The present invention is an Executive Information System (EIS) for managerial planning applications that experience long-range weather impact, and is referred to as a Long-range Executive Weather Information System (LEWIS). In a preferred embodiment of the present invention, the LEWIS system is used to calculate for and display to the planner the impact of weather on retail planning applications from 3 days to 15 months in the future. However, the present invention applies to all industries beyond retailing that experience weather impact, including but not limited to, personal care, utilities, energy, agriculture, consumer products, insurance, transportation, outdoor events, chemicals, pharmaceutical, and construction.

Figure 1:
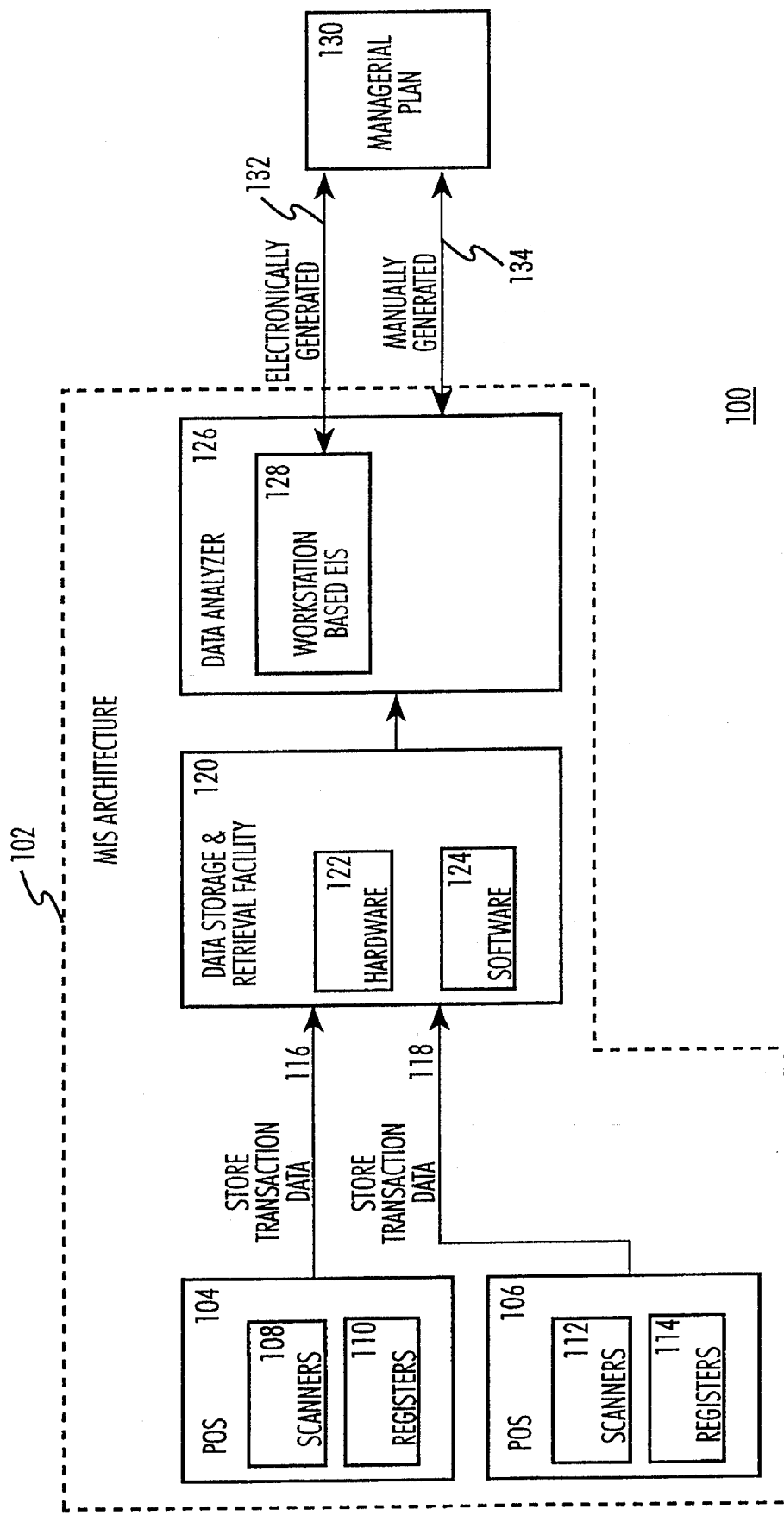
FIG. 1 is a block diagram of a typical management information system (MIS) architecture.
Figure 2:
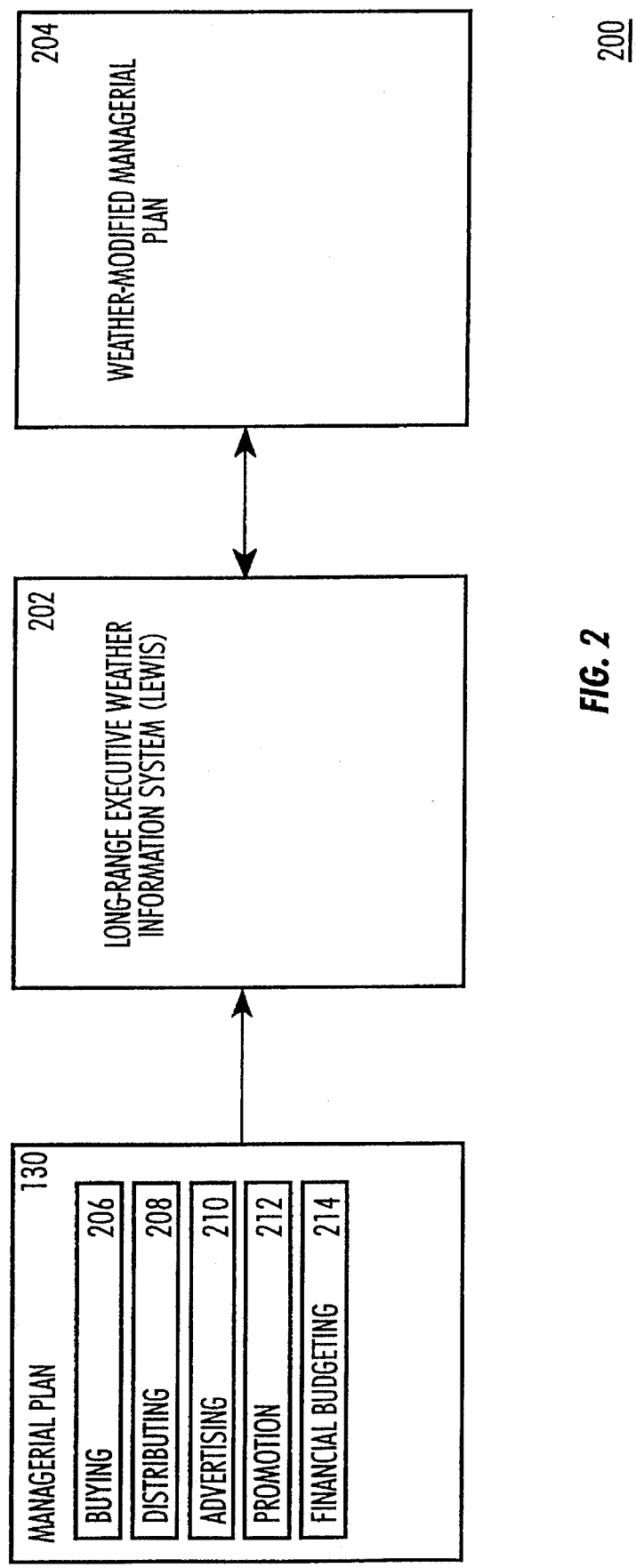
FIG. 2 is a block diagram showing the Long-range Executive Weather Information System (LEWIS) functionality of modifying a managerial plan.

Referring now in detail to the drawings wherein like parts are designated by like reference numerals throughout, FIG. 2 is a block diagram illustrating the use of a LEWIS system to accept as an input a pre-existing managerial plan 130, and to produce a weather-modified managerial plan 204. In a preferred embodiment of the present invention, pre-existing managerial plan 130 can be any weather-impacted managerial plan, this includes, for example, buying product 206, distributing product to specific locations 208, advertising 210, promotions 212, or financial budgeting 214. These applications are by way of example only; the present invention is intended to apply to any managerial application that experiences weather impact.

Figure 3:
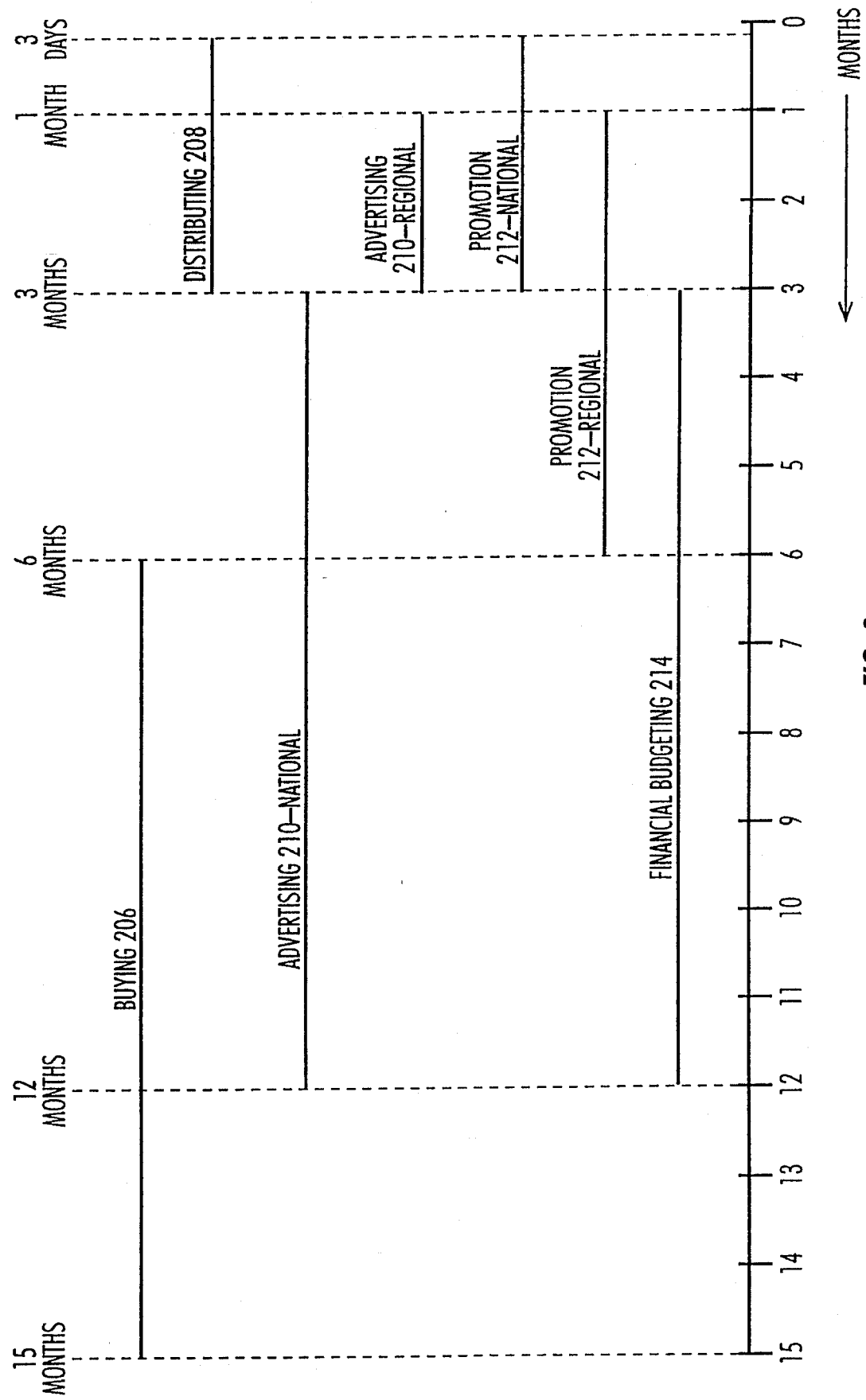
FIG. 3 is a timeline illustrating the leadtime required to execute specific elements of a managerial plan.

FIG. 3 illustrates the typical leadtimes required to execute specific elements of a managerial plan in a large retailer environment. Inherent in the concept of managerial planning is a leadtime for specific activities to be conducted in an organized fashion. Planning activity is commercially desirable because the resulting coordination of managerial and operational regimens allows one to maximize profits relative to an enterprise that merely reacts to market stimuli.

The maximum and minimum leadtimes for the functions depicted in the managerial plan 130 are illustrated according to the time they have to be performed relative to the implementation date of the plan. The duration of the leadtimes illustrated in FIG. 3 are those in which the planning activity is to occur to have commercial value. Note that this illustration is for the USA and is for all purposes of illustration of the present invention.

Buying 206 has a typical leadtime of 6 to 15 months. Distributing 208 has a typical leadtime of 1 week to 3 months. Financial budgeting 214 has a typical leadtime of 3 to 12 months. Advertising 210 and promotion 214 applications are conducted at different levels of retailing such as regional and national levels. As a result, the leadtime required to implement these applications varies according to the targeted level. For example, regional advertising requires 1 to 3 months, while national advertising requires 3 to 12 months. Regional promotion requires a leadtime of 3 days to 3 months, while national promotions require 1 to 6 months. Hence, for the LEWIS 118 to have commercial value in retail industry applications, it must accept and process a managerial plan with a leadtime up to 15 months.

II. MIS Architecture Implementing The Present Invention

Figure 4:
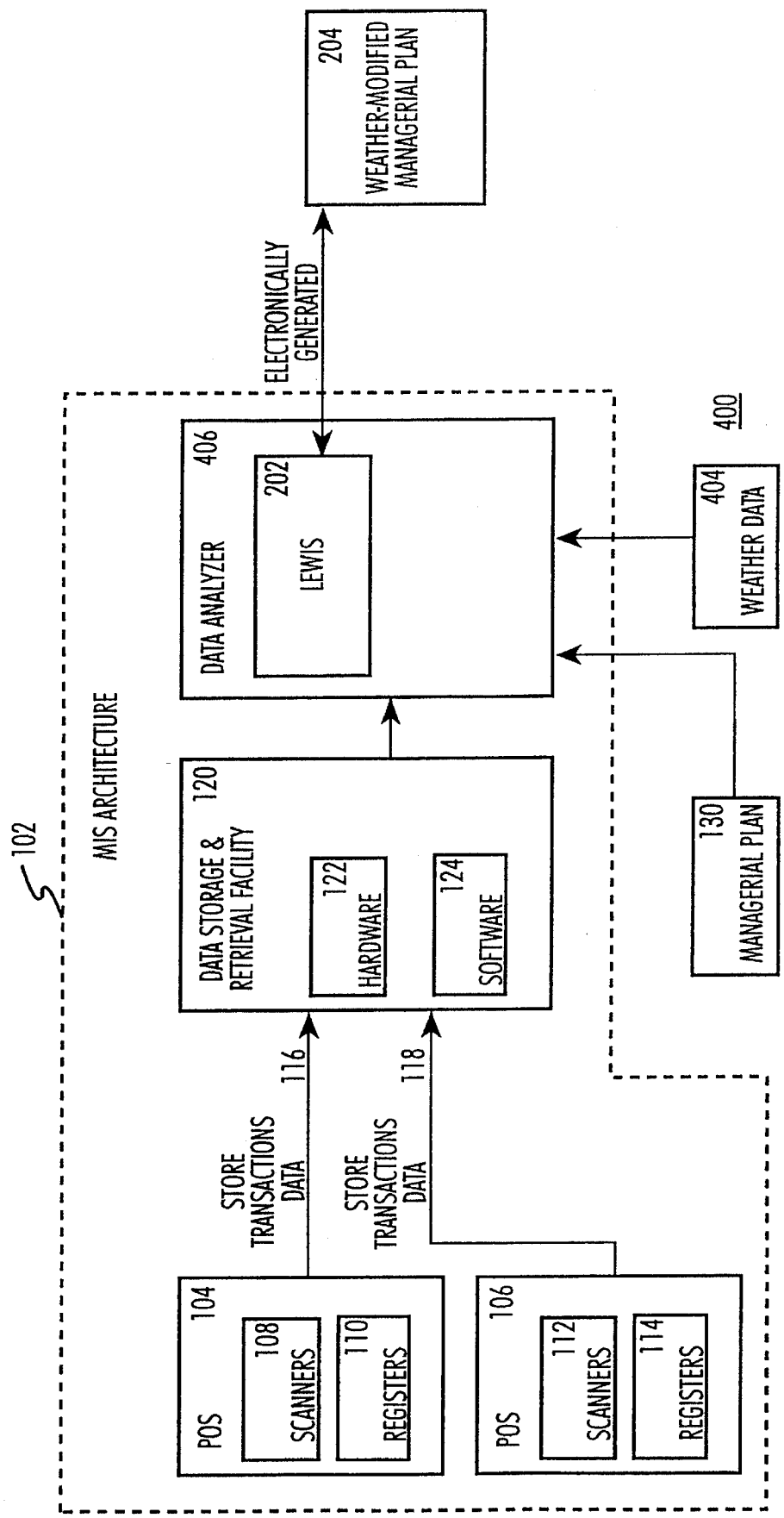
FIG. 4 is a block diagram showing an MIS system containing the LEWIS system of the present invention.

Referring to FIG. 4, this block diagram describes the typical MIS architecture 102 designed to capture transactions data, and electronically flow this data throughout the organization for managerial planning and control purposes, and the residence of LEWIS 202 within this computer-based architecture. In FIG. 4, the arrows depict the flow of data and analysis through the MIS. Retailers sell product to consumers through store locations 104 and 106, and a primary goal of a retail MIS is to gather, store and analyze store transactions data 116 and 118. At the point of sale (POS) 104 and 106 (representing multiple stores), electronic scanners 108, 112, registers 110, 114 and other electronic scanning and data gathering devices record store transactions. Any type of transaction in support of consumer sales activities is collected and flows through the MIS. Note that the term "transaction" is used broadly to represent any type of recordable event taking place in support of consumer sales(that is, inventory transfer from distribution center to store, promotion data, store traffic, etc), not merely the time, amount and merchandise of a specific sale. Also note that the present invention is applicable to one or more locations, metropolitan statistical areas, or regions.

Store transactions data 116 and 118 is electronically transferred to the headquarters typically by modem or broadcasting means, typically on a daily or weekly basis. The headquarters' data storage and retrieval facility 120 receives the data 116, 118 using computer hardware 122 and software 124, which is subsequently used for managerial planning purposes. Depending on the MIS age, scope of data and retailer resources, data storage/retrieval 120 can be a mainframe computer, mid-range computer or Personal Computer (PC) network configuration. For the largest retailers, mainframe storage is typical. Note that the present invention contemplates any computer platform or architecture presently available or developed in the future.

For analytical purposes, the data is retrieved into a data analyzer 406 for use in the preparation of the managerial plan 130. In the preferred embodiment, retrieval of the data into the LEWIS 202 workstation is electronically generated for immediate viewing and use in the preparation of a weather-modified managerial plan 204. In the preferred embodiment, LEWIS 202 resides on a PC, requiring an Intel-type 486 processor (Intel, Sunnyvale, Calif., USA).

Hence, the workstation-based LEWIS 202 implemented within the retailer's MIS architecture 102 receives store transactions data 116, 118 as inputs for analysis to create a weather-modified managerial plan 204.

Figure 5:
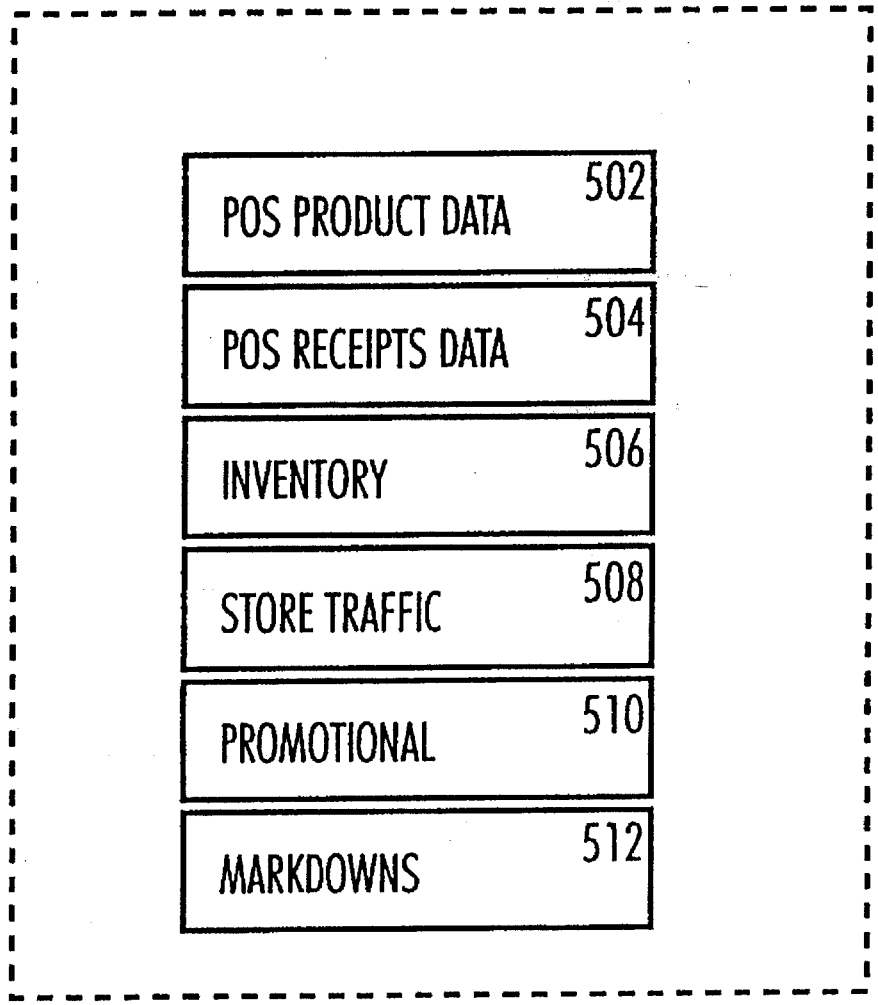
FIG. 5 illustrates types of store transactions data.

FIG. 5 illustrates in block diagram form the store transactions data which is received from the POS locations 104, 106. The various categories of store transactions data 500 can be: POS product data 502, POS total receipt data 504, inventory data 506, store traffic data 508, promotional data 510, and markdown data 512. These categories are by way of example only, and the present invention contemplates any type of store transactions data, or other data collected in the course of an enterprise, which experiences weather impact and can be analyzed to discern commercially valuable analysis for planning purposes. In industries other than retailing, the present invention contemplates any data collected in the course of operating an enterprise which is necessary for and valuable to the activity of planning, including but not limited to Uniform Product Code (UPC) data, shipments to distributors, dealer channel data, and financial market data.

In the preferred embodiment of present invention, the LEWIS system 202 is a computer-based Executive Information System (ELS) residing on a PC workstation having, for example, a model 80486 processor. However, as one of ordinary skill in the art should know, the LEWIS system 202 may reside within any computer-based system, including a mid-range or mainframe architecture.

Figure 6:
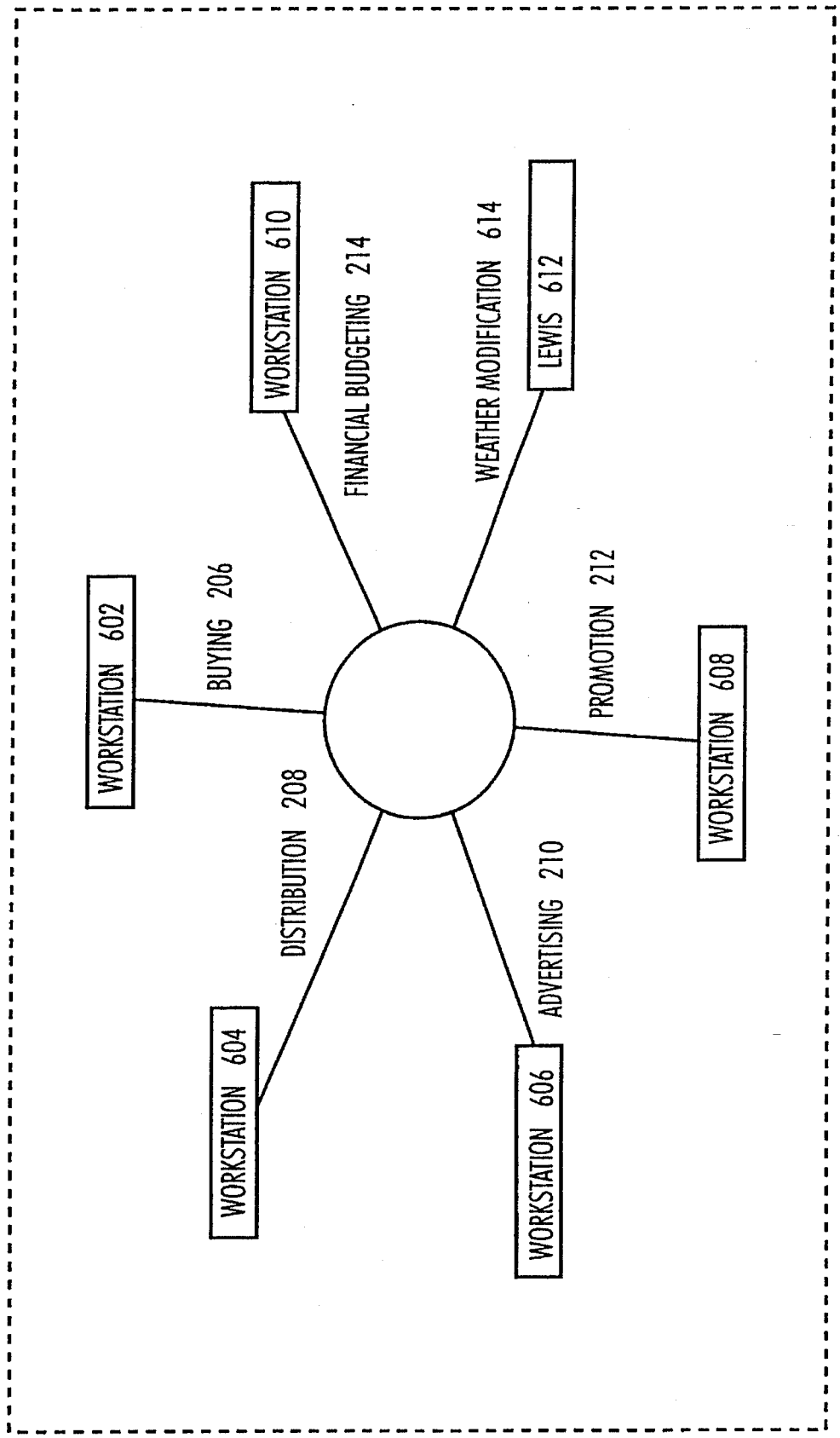
FIG. 6 is a block diagram a data analyzer workstations in a planning application.

Referring to FIG. 6, the preferred embodiment of LEWIS 202 residing on a PC workstation is illustrated. In the configuration shown in FIG. 6, LEWIS system 202 is one of multiple workstations used for planning purposes within data analyzer 406. In the more advanced MIS systems, the data analyzer 406 contains two or more numerous workstations in a network configuration allowing electronic transfer of managerial plans between planning applications residing on the same or different workstation. For example, workstation 602 may be used to perform the buying application 206 portion of the managerial plan 120. Likewise, workstation 604 is used to perform the distribution 208 portion. Workstation 606 is used to perform the advertising 210 portion. Workstation 608 is used to promotion 212 portion. Workstation 610 is used to perform the financial budgeting 214 portion.

The LEWIS system 612 is then used to modify one or all of the above applications 502, 504, 506, 508, 510, and 512, of the managerial plan 120. This modification to the managerial plan 120 using the LEWIS system 202 is referred to as weather modification 614.

Figure 7:
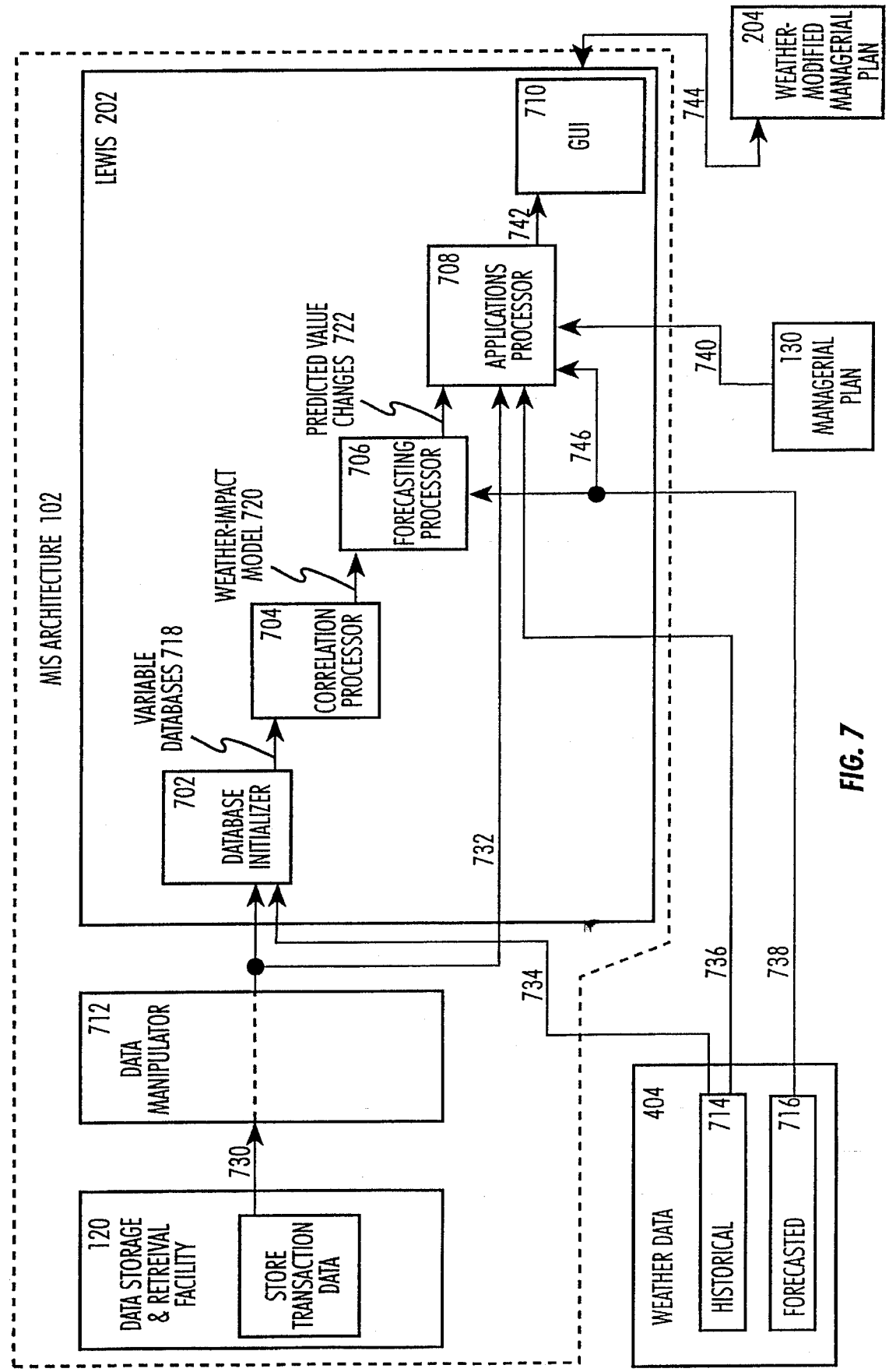
FIG. 7 is a block diagram illustrating the data flow and analytical process of LEWIS.

Referring to FIG. 7, a block diagram of the data flow and analytical processes resident within the LEWIS system 202 is illustrated. In FIG. 7, LEWIS system 202 includes a database initializer 702, a correlation processor 704, a forecasting processor 706, an applications processor 708, and a graphical user interface (GUI) 710, described in detail below.

LEWIS system 202 interfaces with the retailer's MIS data storage and retrieval system 120 to receive store transaction data initially generated at POS locations. In the preferred embodiment of the present invention, the store transaction data received from the data storage and retrieval system 120 is a subset of the store transaction data. Specifically, the preferred embodiment of LEWIS system 202 utilizes POS product data 502 and promotional data 510. However, the LEWIS system 202 may use all types of store transaction data illustrated in FIG. 5. In addition, for industries other than retailing, LEWIS 202 may be used with any data collected in the course of operating an enterprise which is necessary for and valuable to the activity of planning.

Depending on the structure of the data fields residing in the data storage and retrieval facility 120, LEWIS system 202 may require the data to be aggregated or manipulated. This function may be performed by a data manipulator 712. Alternatively, database initializer 702 of LEWIS system 202 may be also configured to aggregate or manipulate the data. For this example, POS product data 502 must often be aggregated into product categories, weekly totals and combined with other store locations in a Metropolitan Statistical Area (MSA). Promotional data 510 must be represented as a dummy variable set. For example, if promotion occurred during a given week, assign '1', if not assign '0'. Alternatively, the data storage and retrieval facility may store the store transaction data in an appropriate format for use by the LEWIS system 202 without aggregation or manipulation.

Weather data 404 includes both historical weather data 714 and forecasted weather data 716. Historical weather data 714 is defined as data to document past weather occurrences on a daily basis. Historical weather data 714 can be any parameter of temperature, precipitation, humidity and other common meteorological factors.

Forecasted weather data 716 is defined as predicted weather in time increments for specific locations from 1 week to 15 months in the future. The forecasted weather data 716 used by the LEWIS system 202 is in weekly time increments. Forecasted weather data 716 is commercially available from Strategic Weather Services, Wayne, Pa., U.S.A. However, the LEWIS system 202 may receive data in any time increment which is useful to the particular application, including daily and monthly time increments.

The database initializer 702 automatically sets up the store transaction data 500 received from the data storage and retrieval facility 120, and places the data into databases using mathematical relationships (discussed below). The database initializer 702 transforms the datasets into the proper form for the correlation processor 704.

In the preferred embodiment of the present invention, historical POS product data 502 and promotional data 510 are correlated with historical weather data 714. The correlation processor 704 develops the relationship between the POS product data 500 and weather data 404 which is expressed in the weather impact model 720. The forecasting processor 706 applies the forecasted weather data 716 to the weather impact model 720 to produce predicted value changes 722. Applications processor 708 receives the predicted value changes 722 from the forecasting processor 706. In conjunction with historical weather data 714, forecasted weather data 716, managerial plan 130, and store transaction data 500, the applications processor 708 quantitatively modifies a forecast from a managerial plan 130 and generates relative comparisons of weather impact on specific products at specific locations and times. A graphical user interface 710 allows the user to make modifications to a managerial plan 130 based on forecasted weather impact.

III. Database Initializer 702

Figure 8:
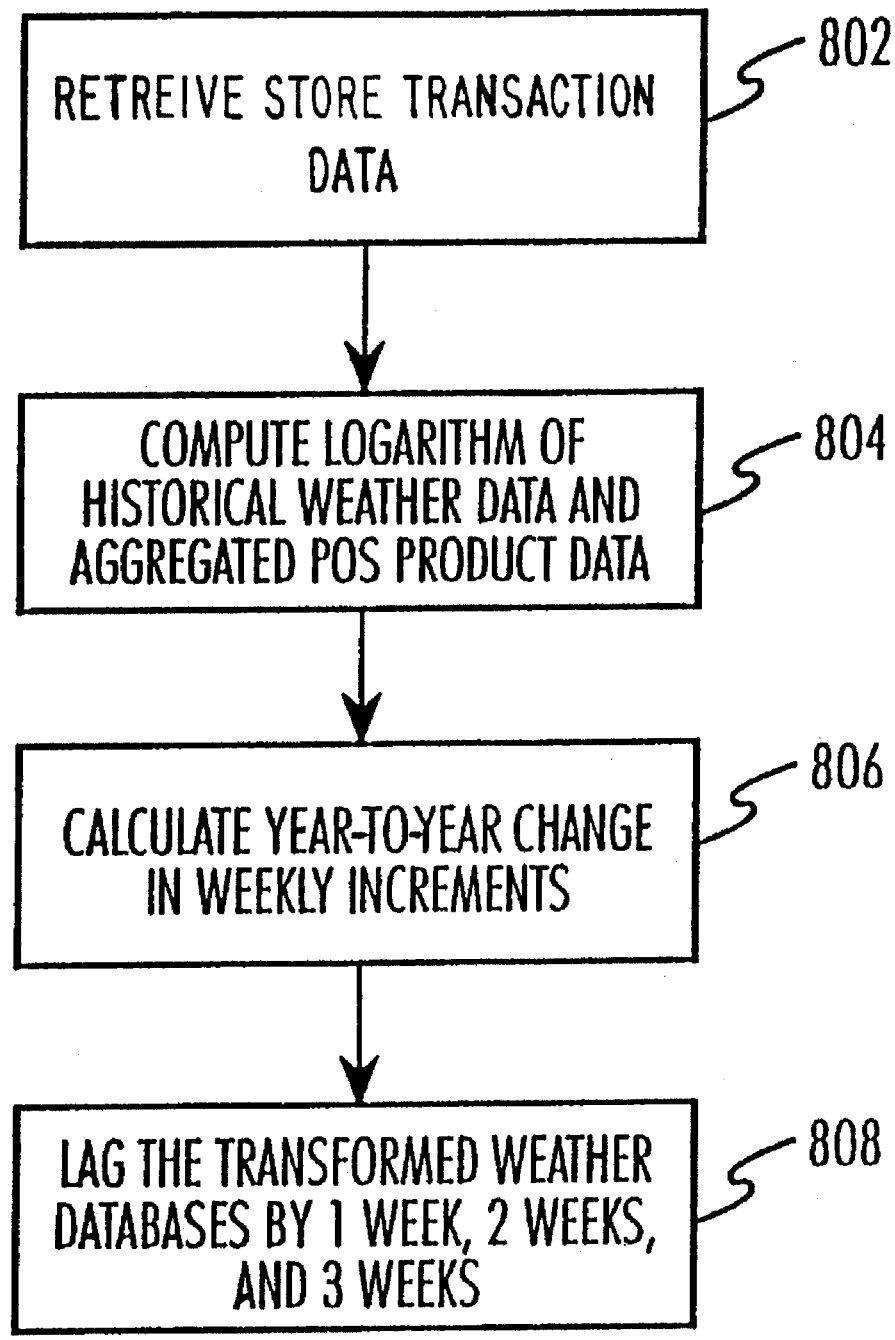
FIG. 8 is a flowchart of the database initializer.

FIG. 8 is a flow chart illustrating the processing steps which are performed by the database initializer 702 in a preferred embodiment of the present invention wherein the correlation processor 704 uses multiple regression to determine the weather impact model 720.

In this example, three major data transformations are performed by database initializer 702 after retrieving store transaction data 730, step 802. The first transformation is the computation of the logarithm of the historical weather data 714, and the logarithm of the aggregated POS product data 732, step 804. In this example, promotional data 510 is represented as a dummy variable to mathematically express the qualitative nature of promotional versus nonpromotional periods. Hence, promotional data 510 does not need a logarithmic transformation.

Next, the database initializer 702 performs the second transformation by calculating the year-to-year change in the logged historical weather data, logged POS product data 804, and promotional data 510, step 806. The data initializer 702 calculates the year-to-year changes in weekly increments, step 806, which is typically the level of accuracy required in the retail industry.

The third transformation performed by the data initializer 702 is the lagging of the logged historical weather data by one week, two weeks, and three weeks, step 808, so as to capture the residual weather impact beyond one week.

The resulting variable databases 718 which are produced by the database initializer 702 are sent to the correlation processor 704.

IV. Correlation Processor 704

A. Multiple Regression Embodiment

Correlation processor 704 quantifies the weather impact model 720 by performing a least squares multiple regression analysis on the variable databases 718. Least squares multiple regression is a public domain mathematical algorithm used as a means of quantifying the relationship between variables, and is well known in the art.

Figure 9:
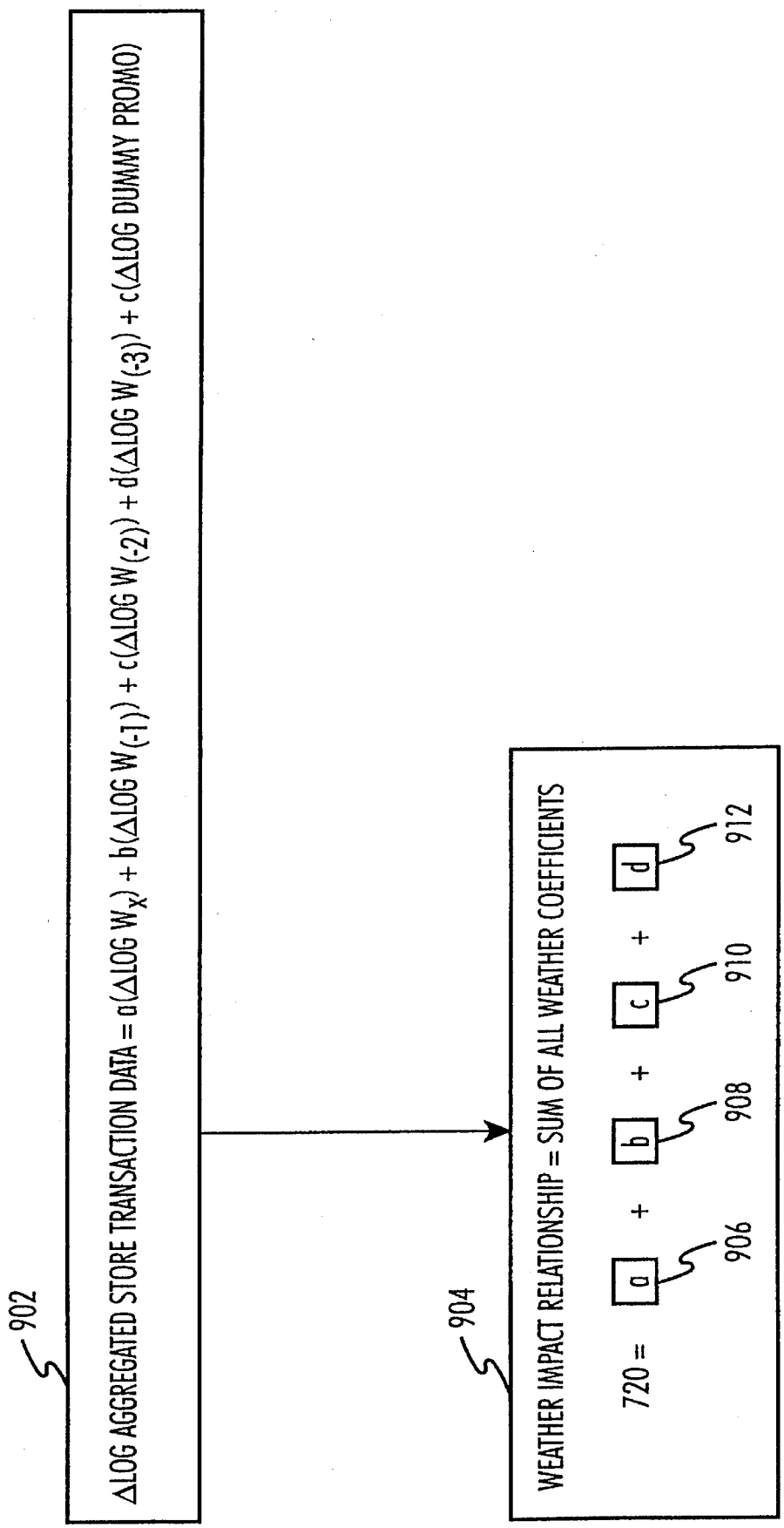
FIG. 9 is a block diagram of the multiple regression embodiment of the correlation processor.

Referring to FIG. 9, the least squares multiple regression algorithm 902 is illustrated in quadratic form. Solution of this multiple regression equation quantifies the coefficients a (demonstrated by reference number 906), b (demonstrated by reference number 908), c (demonstrated by reference number 910), and d (demonstrated by reference number 912). The sum of these coefficients 904 yields the weather impact relationship 720.

FIG. 9 represents the preferred multiple regression embodiment. However, one skilled in the art of multiple regression would realize that other transformations can be utilized.

B. Neural Network Embodiment

Figure 10:
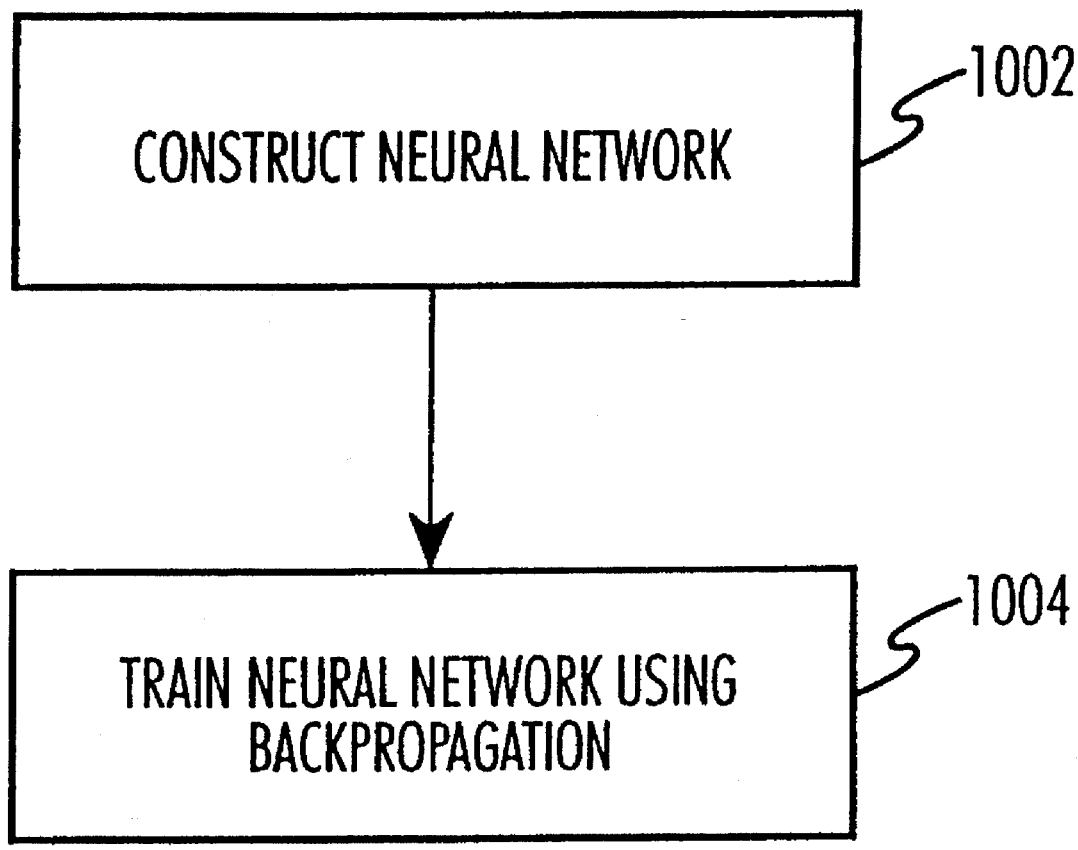
FIG. 10 is a block diagram of the neural network embodiment of the correlation processor.

FIG. 10 is a block diagram and flow chart describing a neural network embodiment of the correlation processor 704. The neural network correlation processor 704 performs two steps: constructing 1002 and training 1004. Please note that database initializer 702 is required for both the multiple regression and the neural network preferred embodiments of the correlation processor 704.

Neural network correlation processor 704 is a computer simulation model of interconnected biological neural structures. The starting point for most neural networks is a model neuron 1101. It should be understood that the analogy to the human neuron within a brain is important and useful in understanding the present invention. However, the present invention is a computer simulation of human neurons working in a network.

Figure 11A:
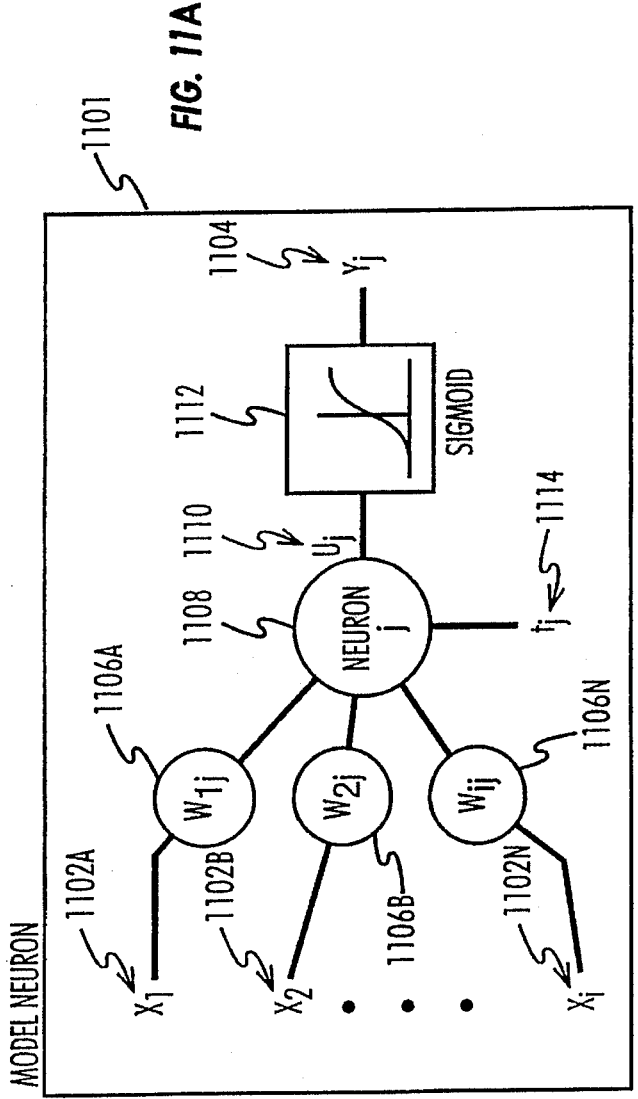
FIG. 11A and FIG. 11B collectively depict a block diagram defining the neural network analytical process.
Figure 11B:
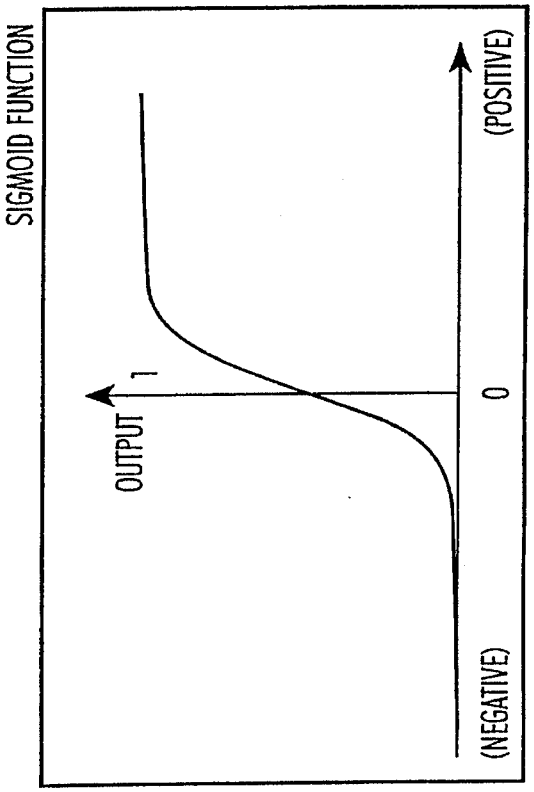

Model neuron 1101 comprises multiple inputs 1102A–1102N (collectively and generally referred to as 1102) and a single output 1104. Each input 1102 is modified by a corresponding weight 1106A–1106N (collectively and generally referred to as 1106), which multiplies with the input value. The neuron 1108 will combine (as indicated by a reference number 1110) these weighted inputs and, with reference to a threshold value 1112, use these to determine its output 1104. This thresholding function is usually the sigmoid function 1112, which has an input to output mapping as shown in FIG. 11A and FIG. 11B. This model neuron of FIG. 11A follows closely our present understanding of how real neurons work, and is the basic analytical process underlying neural network correlation processor 704.

While there is a fair understanding of how an individual neuron works, there is still a great deal of research and mostly conjecture regarding the way neurons organize themselves and the mechanisms used by arrays of neurons to adapt their behavior to external stimuli. There are a large number of experimental neural network structures currently in use reflecting this state of continuing research.

Essentially, a neural network is a hierarchical collection of model neurons 1101, each of which computes the results of an equation, which typically requires inputs 1102, input weights 1106, a neuron 1108, a sigmoid 1112 or other threshold function, to produce and output 1104. Each model neuron equation utilizes multiple inputs 1102, but produces only one output 1104. The outputs of the model neurons in a lower level (that is, closest to the original input datasets) are provided as inputs to the elements of the higher layers, the highest layer produces the final output.

1. Constructing a Neural Network

Figure 12:
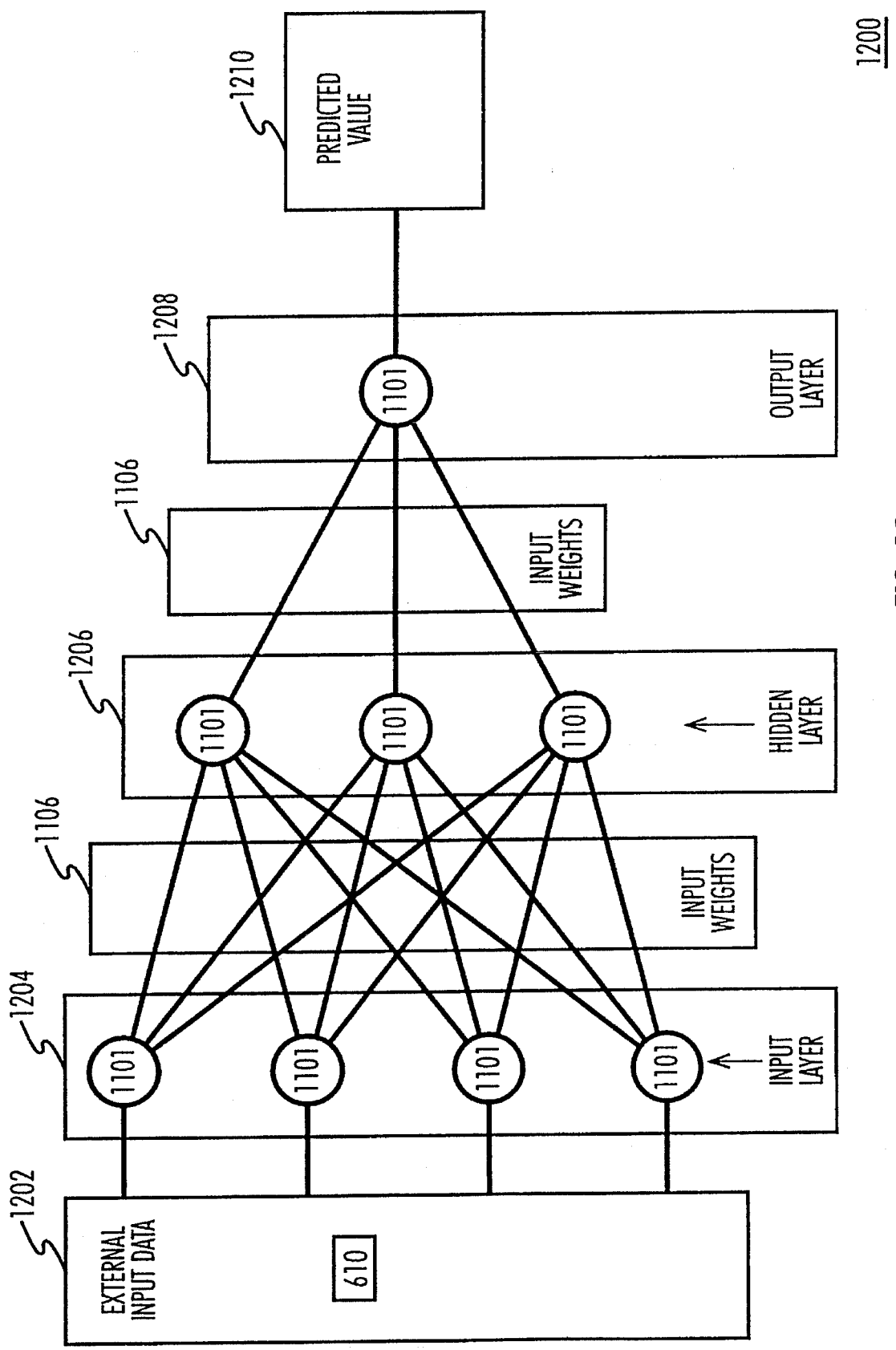
FIG. 12 is a block diagram of a neural network constructed to utilize the backpropagation algorithm.

Referring now to FIG. 12, by way of example, a description is provided of the structure, mathematics and behavior of that structure known as the backpropagation neural network 1200. This is the most prevalent and generalized neural network currently in use. However, the present invention contemplates the use of any other type of neural network applicable to the correlation process of historical weather data 404 with any type of variable database 718 or any other type of data collected in the course of business that experiences weather impact.

FIG. 12 has three layers of neurons: an input layer 1204, a hidden layer 1206, and an output layer 1208. Input layer 1204 includes inputs 1102 which take their values from the external input data 1202, which for this present invention are the variable databases 718. A layer has all its inputs 1102 connected to either a preceding layer as the outputs 1104 from that preceding layer, or the inputs are the initial external input data 1202; but never both conditions within a layer. A layer has all its outputs 1104 connected to either a succeeding layer as inputs 1102 to that succeeding layer, or to the external world as the final outputs, but never both conditions within the same layer.

Note that additional hidden layers 1206 can be used as the number of variable databases increases. Again, they would take the outputs 1104 from the previous layer as their inputs 1102.

Multiple layers are then arrayed one succeeding the other so that there is an input layer 1204, multiple hidden layers 1206 and finally an output layer 1208. Hidden layers 1206 are so named because they have no inputs 1102 or outputs 1104 to the external world.

Backpropagation neural networks 1200 are usually fully connected. This means that each neuron 1101 is connected to every output 1104 from the preceding layer, using the output 1104 from the preceding layer as an input 1102 (if the neuron 1101 is in the initial input layer 1204, then the neuron uses external input data 1202). Correspondingly, each neuron 1101 has its output 1104 connected to every neuron 1101 in the succeeding layer as an input 1102 for that succeeding layer. (If the neuron 1101 is in the output layer 1208, than the output 1104 of that neuron is a predictive value for the external world).

The input layer 1204 is considered a distributor of the signals from the external world. Hidden layers 1206 are considered to be categorizers or feature detectors of such signals. The output layer 1208 is considered a collector of the features detected and producer of the predictive value 1210 for the external world.

Each input 1102 for each neuron 1108 in each layer of a neural network 706 has an adjustable constant called a weight 1106. Weights 1106 determine how much relative effect an input 1102 value has on the output 1104 value of the model neuron 1101. Consider all of the weights 1106 for all of the inputs 1102 for all of the neurons 1101 in all of the layers, in totality. The neuron weights are analogous to the weather impact relationship 904 quantified by the summation of all weather coefficients 906–912 using the multiple regression preferred embodiment.

In summary, the output 1104 of each neuron 1101 is a function of its inputs 1102. In particular, the output of the jth neuron in any layer is described by two sets of equations:

$$Uj = \text{SUMMATION}(Xi * Wij) \qquad \text{[Equation 1]}$$

$$Yj = Fth(Uj + tj) \qquad \text{[Equation 2]}$$

For every neuron [1101]j, in a layer, each of the i inputs [1102], Xi, to that layer is multiplied by a previously established weight [1106], Wij. These are all summed together, resulting in the internal value of this operation, Uj[1110]. This value is then biased by a previously established threshold value, tj[1114], and sent through a sigmoid thresholding function, Fth[11121]. The resulting output, Yj[1104], is an input 1102 to the next layer or it is the predictive value of the neural network embodiment if it is the output layer 1208.

2. Training a Neural Network

Figure 13:
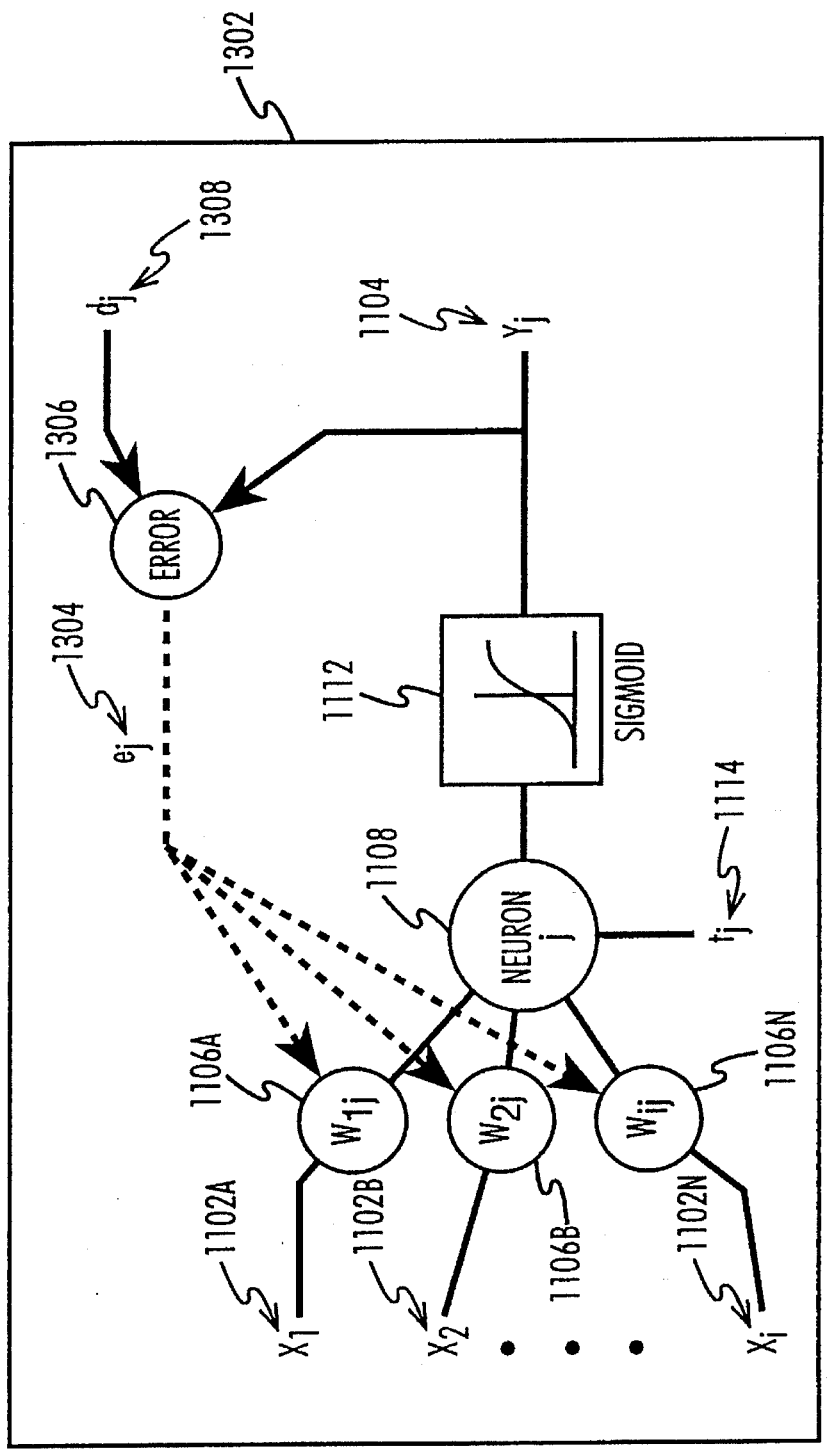
FIG. 13 is a block diagram and flow chart showing the training of a neural network to quantify the weather impact relationship by utilizing the backpropagation algorithm to reduce predictive error through feedback loops of the algorithm through the neural network in FIG. 12.

The broad concept of training describes or shows a desired response, measures error between actual and desired response (the error), and provides feedback for successive iterations which reduce error. Referring now to FIG. 13, with a neural network, the error 1306 is determined and a portion 1304 of error 1306 is propagated backward through the network. At each neuron 1101 in the network the error 1306 is used to adjust the weights 1106 and threshold values 1112 of the neuron, so that the next time, the error 1306 in the network response will be less for the same inputs 1102.

This corrective procedure is called backpropagation training 1302 (hence the name of the neural network), which is applied repetitively for each set of inputs 1102 and corresponding set of outputs 1104 produced in response to the inputs 1102. Backpropagation continues so long as the individual or total errors 1306 in the responses exceed a predetermined error threshold. Backpropagation 1302 ends only when an acceptable error level is achieved. Error level is calculated by comparing output data 1104 to a known set of desired values 1308 commonly termed the input training data(not shown).

Backpropagation starts at the output layer with the following equations:

$$Wij = W'ij + LR * ej * Xi \qquad \text{[Equation 3]}$$

$$ej = Yj * (1 - Yj) \qquad \text{[Equation 4]}$$

For the ith input 1102 of the jth neuron 1101 in the output layer, the weight wij is adjusted by adding to the previous weight value, w'ij, a term determined by the product of a learning rate, LR, an error term 1304, ej, for the ith input 1102, Xj. The error term, ej[1304], for the jth neuron 1101 is determined by the product of the actual output, Yj[1104], its complement, 1–Yj, and the difference between the desired output, dj, and the actual output 1104.

Once the error terms 1304 are computed and weights 1106 are adjusted for the output layer 1208, the values are recorded and the next layer back is adjusted. The same weight adjustment process using $$Wij = W'ij + LR * ej * Xi \qquad \text{[Equation 5]}$$

is followed, but the error term is generated by a slightly modified version of is:

$$ej = Yj * (1-Yj) * (dj-Yj) \qquad \text{[Equation 6]}$$

This modified version of the error term is:

$$ej = Yj * (1-Yj) * \text{SUMMATION}(ek * w'jk) \qquad \text{[Equation 7]}$$

In this version of the present invention, the difference between the desired output and the actual output is replaced by the sum of the error terms 1304 for each neuron 1101, k, in the layer immediately succeeding the layer being processed (the process is going backwards through the layers so these terms have already been computed) times the respective pre-adjustment weights. The learning rate, LR, applies a greater or lesser portion of the respective adjustment to the old weight.

As the network backpropagates 1302, the total error 1306 will become smaller and smaller. Once the network reduces the total error 1306 to the acceptable limits, backpropagation 1302 will stop. Once trained, the neural network 1200 is ready to produce predictive values. Relative to the present invention, a fully trained neural network 1200 has calculated the weather impact model 720.

3. Neural Network — Distinction From Multiple Regression

The neural network 1200 embodiment of file correlation processor iteratively adjusts the weights 1106 between associated inputs 1102 and 1104, using mathematical algorithms that do not require any human intervention beyond selection and manipulation of datasets for entry into LEWIS 202.

While the multiple regression embodiment 902 of LEWIS 202 also has limited human intervention, the neural network 1200 may arrive at a more detailed expression of the interrelationship between variables which determines the weather impact model 720 with higher accuracy. With less complex datasets, both correlation algorithms typically arrive at similar predicted values changes 722. For example, POS datasets with heavy promotional impact create a more complex correlation problem, typically more suited to a neural network-based correlation processor.

V. Forecasting Processor

Figure 14:
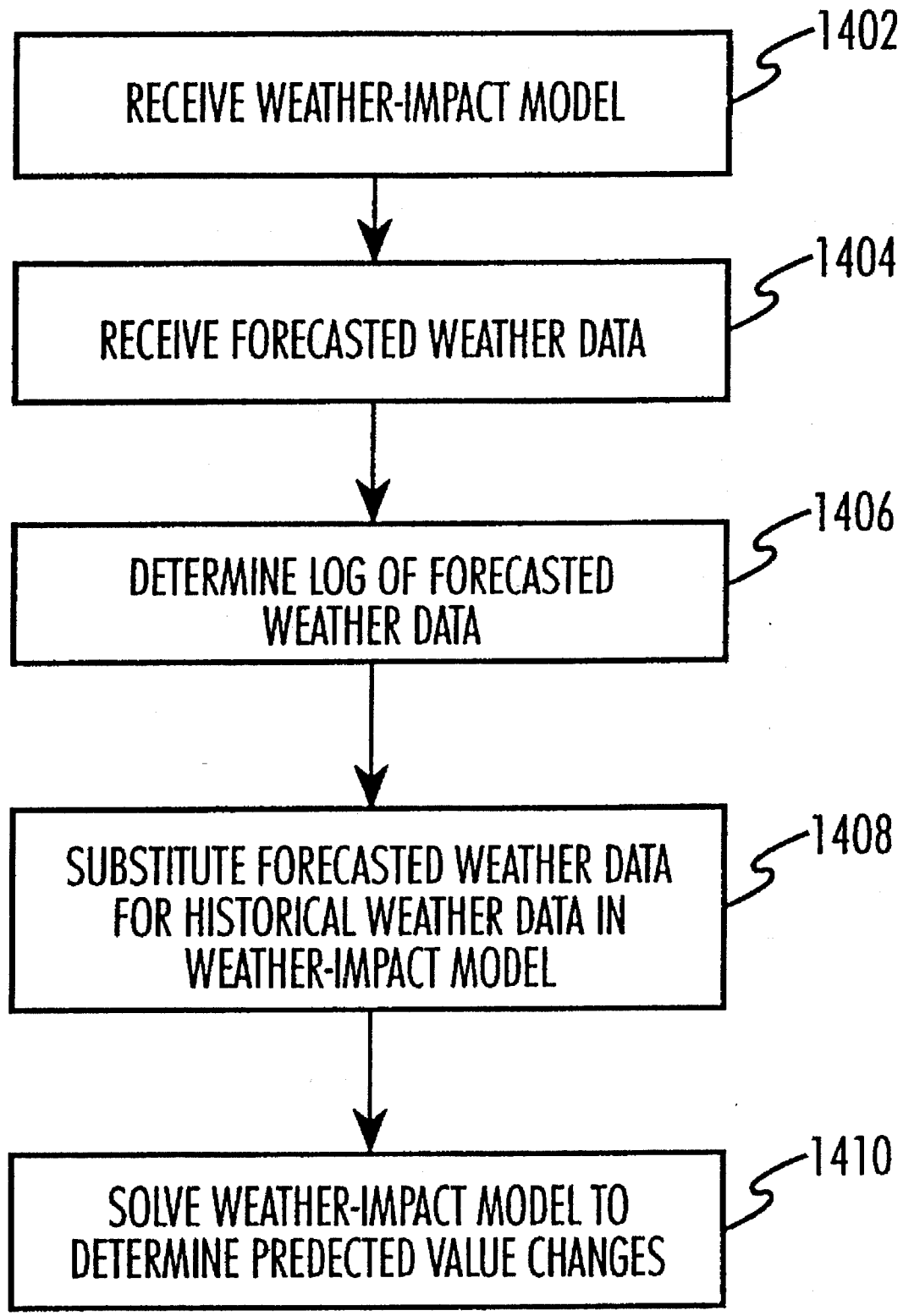
FIG. 14 is a flowchart of the forecasting processor.

The forecasting processor 706 depicted in FIG. 14 operates in the same manner regardless of the correlation embodiment.

The forecasting processor 706 accepts the weather-impact model 720, step 1402. It also accepts the forecasted weather data 716 available from Strategic Weather Services, Wayne, Pa., U.S.A, step 1404. It then converts forecasted weather data 716 to logarithmic form, step 1406. Then the logarithmic form is substituted for historical weather data 714 contained in the weather-impact model 720, step 1408. The weather-impact model 720 is then solved utilizing the weather forecast data 716, step 1410. This output represents the predicted value changes 722 to the managerial plan 130.

VI. Applications Processor

Figure 15:
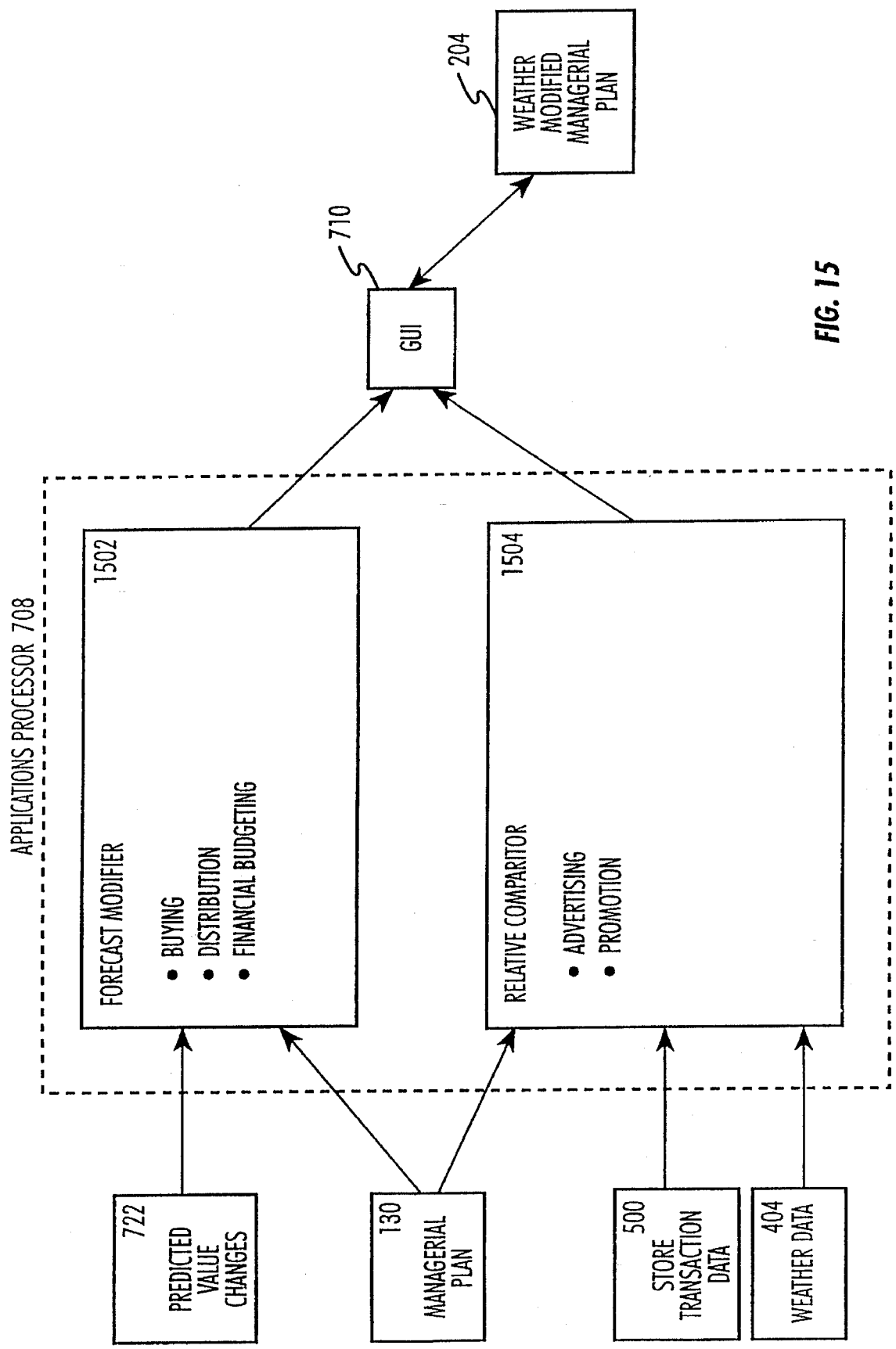
FIG. 15 is a block diagram of the applications processor.

FIG. 15 illustrates a block diagram of the applications processor 708 used to modify the managerial plan 130 to produce a weather modified managerial plan 204 represented by the graphical user interface 710.

The managerial planning applications of buying 206, distributing 208 and financial budgeting 214 require the applications processor 708 to quantitatively modify the unit, dollar or other types of forecasts from the managerial plan 130. This function is performed by forecasting modifier 1502. Forecasting modifier 1502 sums the forecast received from the managerial plan 130 with the predicted value changes 722 received from the forecasting processor 706. The resulting modification of the managerial forecast is outputted to the graphical user interface 710 for representation and viewing.

The managerial applications of advertising 210 and promotion 212 require the applications processor 708 to provide a comparison 1504 of the least and most favorable time periods for these two planning activities for specific products at specific locations. This comparison contains the following comparative values for each product at each location: (1) strength of weather influence, defined by weather impact model 720, (2) the relative product volume at each location, defined by store transaction data 500, and (3) the weather forecast data 716 for each location and time period. The results of this comparison are viewed through the graphical user interface 710.

The forecast modifier 1502 and relative comparator 1504 are examples of the use of specific transactions data to determine various characteristics of a managerial plan relative to weather impact. The present invention may use other types and combination of store transaction data, weather data 404, or other types of data that experience weather impact.

Generally, computer software evolves in layers of program development, with the most basic layer being the computer code for the various computer operating systems. Other layers of software incorporate, typically under commercial license, pre-existing software programs as building blocks for innovative software to extend computer functionality.

In the preferred embodiment of the present invention, the database initializer 702, correlation processor 704, forecasting processor 706, and applications processor 708 are implemented with commercially available spreadsheet software products, such as the 'ONE-UP' spreadsheet product, manufactured by Comshare Inc., Ann Arbor, Mich. The graphical user interface 710 is implemented in the 'COMMANDER' graphical user interface product manufactured by Comshare Inc. However, the present invention is not limited to these products, and contemplates any spreadsheet or graphical user interface approach with similar or greater functionality.

Although the invention has been described and illustrated with a certain degree of particularity, it is understood that those skilled in the art will recognize a variety of additional applications and appropriate modifications within the spirit of the invention and the scope of the claims.

What is claimed is:

1. A computer-based system for generating a weather-modified managerial plan, comprising:

first means for providing store transaction data;

second means for providing historical weather data;

third means for providing forecasted weather data;

fourth means for providing a managerial plan including forecast data;

database initializer means for performing one or more transformations of said store transaction data and said historical weather data to produce variable databases, including, comparing means for comparing a first set of values occurring during a first interval in a first period with a second set of values occurring in a second interval in a second period, and for computing the change in said first and second sets of values, and lagging means for lagging said logged values of said historical weather data by a third interval, a fourth interval, and a fifth interval;

correlation processor means for generating a weather impact model in accordance with said variable databases, said weather impact model expressing a correlation between said store transaction data contained in said variable databases and said historical weather data;

forecasting processor means for producing predicted value changes of said store transaction data using said weather impact model and said forecasted weather data; and applications processor means for providing a weather-modified managerial plan in accordance with said forecasted weather data, said managerial plan, said historical weather data, and said predicted value changes.

2. A computer-based system for generating a weather-modified managerial plan that represents future predictions of weather impact on retail sales, comprising:

first means for providing point of sale store transaction data;

second means for providing historical weather data;

a database initializer to create a variable database of aggregated store transaction data by performing one or more transformations on said aggregated store transaction data and said historical weather data;

a correlation processor, coupled to said database initializer, adapted to receive said variable databases containing said weather impacted data and to generate a weather impact model, said weather impact model expressing a correlation between said store transaction data contained in said variable database and said historical weather data;

third means for providing forecasted weather data;

a forecasting processor, coupled to said correlation processor, configured to produce an output of predicted value changes of said weather impacted data in accordance with said weather impact model and said forecasted weather data;

substitution means for substituting logged values of said historical weather data with substitute logged values of said forecasted weather data in said weather impact model, and computation means for solving for said predicted value changes using said weather impact model and said substitute logged values of said forecasted weather data;

fourth means for providing a managerial plan including forecast data; and an applications processor, adapted to provide a weather-modified managerial plan in accordance with said forecasted weather data, said managerial plan data, said historical weather data, and said predicted value changes, including, forecast modifier means for modifying said forecast data of said managerial plan based on said predicted value changes, and comparator means for comparing user-selected characteristics of said managerial plan and said weather-modified managerial plan to generate a relative comparison illustrating said comparison.

3. The system of claim 2, wherein said database initializer means comprises:

comparing means for comparing a first set of values of said store transaction data occurring during a first interval in a first year with a second set of values occurring in a second interval in a second year, and for computing the change in said first and second sets of values; and lagging means for lagging said historical weather data by a third interval.

4. The system of claim 3, wherein said first, said second, and said third intervals are a week.

5. The system of claim 4, wherein said correlation processor means is configured to perform a least squares multiple regression on said variable database to produce said weather impact model.

6. The system of claim 5, further comprising a graphical user interface for receiving said weather-modified managerial plan from said application processor means and for displaying said weather modified managerial plan in a user-specified manner.

7. A computer-based system for generating a weather-modified managerial plan that represents future predictions of weather impact from three days or more in advance with regard to retail sales, comprising:

(a) first means for providing store transaction data;

(b) second means for providing historical weather data;

(c) database initializer means, responsive to said first means and to said second means, for performing one or more transformations of said store transaction data and said historical weather data to produce variable databases;

(d) correlation processor means, responsive to said database initializer means, for generating a weather impact model in accordance with said variable databases, wherein said weather impact model expresses a correlation between said store transaction data contained in said variable databases and said historical weather data;

(e) third means for providing forecasted weather data;

(f) forecasting processor means, responsive to said correlation processor means, for producing predicted value changes of said store transaction data using said weather impact model and said forecasted weather data;

(g) fourth means for providing a managerial plan including forecast data; and (h) applications processor means, responsive to said forecasting processor means, said third means, and said fourth means, for providing a weather-modified managerial plan in accordance with said forecasted weather data, said managerial plan, said historical weather data, and said predicted value changes;

wherein said database initializer means transforms an aggregate of said store transaction data to a form usable by said correlation processor means;

wherein said forecast processor means comprises:

substitution means for substituting logged values of said historical weather data with substitute logged values of said forecasted weather data in said weather impact model; and computation means for solving for said predicted value changes using said weather impact model and said substitute logged values of said forecasted weather data.

8. The system of claim 7, wherein said correlation processor means is a neural network correlation processor.

9. The system of claim 7, further comprising a data manipulator means, coupled between said first means and said database initializer means, for aggregating said store transaction data.

10. The system of claim 7, wherein said first means comprises: data gathering means for recording said store transaction data; and a data storage and retrieval facility configured to receive said store transaction data from said data gathering means, and configured to store said store transaction data in a computer-readable format.

11. The system of claim 7, wherein said database initializer means comprises:

comparing means for comparing a first set of values of said store transaction data occurring during a first interval in a first period with a second set of values of said store transaction data occurring in a second interval in a second period, and for computing the change in said first and second sets of values, wherein said first and second intervals are equal to a first length of time and said first and second periods are equal to a second length of time, and wherein said first length of time is less than or equal to said second length of time.

12. The system of claim 11, wherein said database initializer means further comprises:

lagging means for lagging said logged values of said historical weather data by a third interval, a fourth interval, and a fifth interval.

13. The system of claim 11, wherein said second length of time is a week.

14. The system of claim 13, wherein said second length of time is a year.

15. The system of claim 11, wherein said first length of time is a day.

16. The system of claim 15, wherein said second length of time is a year.

17. The system of claim 12, wherein said correlation processor means is configured to perform a least squares multiple regression on said variable databases to produce said weather impact model.

18. The system of claim 17, wherein said applications processor means comprises:

forecast modifier means for modifying said forecast data of said managerial plan based on said predicted value changes.

19. The system of claim 18, wherein said applications processor means further comprises:

comparator means for comparing user-selected characteristics of said managerial plan and said weather-modified managerial plan to generate a relative comparison illustrating said comparison.

20. The system of claim 19, wherein said user-selected characteristics include a degree of influence of user-selected weather characteristics on user-selected store transaction data, said degree of weather influence obtained from said weather impact model.

21. The system of claim 19, wherein said user-selected characteristics include characteristics of said store transaction data.

22. The system of claim 19, wherein said user-selected characteristics include characteristics limited to a geographic location.

23. The system of claim 19, wherein said user-selected characteristics include characteristics limited to a selected one or more of said first and second intervals of said first and second periods.

24. The system of claim 19, further comprising a graphical user interface for receiving said weather-modified managerial plan from said application processor means and for displaying said weather modified managerial plan in a user-specified manner.

* * * * *